(12) United States Patent
Ishimori et al.

(10) Patent No.: US 10,088,609 B2
(45) Date of Patent: Oct. 2, 2018

(54) LIGHT DIFFUSER AND ITS USE

(71) Applicant: Sekisui Plastics Co., Ltd., Osaka-shi (JP)

(72) Inventors: Fumitaka Ishimori, Koka (JP); Kazuki Machida, Koka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/023,821

(22) PCT Filed: Sep. 24, 2014

(86) PCT No.: PCT/JP2014/075238
§ 371 (c)(1),
(2) Date: Mar. 22, 2016

(87) PCT Pub. No.: WO2015/046222
PCT Pub. Date: Apr. 2, 2015

(65) Prior Publication Data
US 2016/0231470 A1    Aug. 11, 2016

(30) Foreign Application Priority Data

Sep. 30, 2013    (JP) .................................. 2013-204576

(51) Int. Cl.
*F21V 1/00* (2006.01)
*G02B 5/02* (2006.01)
(Continued)

(52) U.S. Cl.
CPC ............... *G02B 5/02* (2013.01); *F21K 9/232* (2016.08); *F21V 3/0625* (2018.02);
(Continued)

(58) Field of Classification Search
USPC ........................................................ 362/217
See application file for complete search history.

(56) References Cited

U.S. PATENT DOCUMENTS

| 2005/0068619 A1* | 3/2005 | Osawa | G03B 21/60 359/456 |
| 2011/0285939 A1 | 11/2011 | Nakashima et al. | |
| 2012/0286314 A1 | 11/2012 | Shinohara et al. | |

FOREIGN PATENT DOCUMENTS

| JP | 2008-091140 A | 4/2008 |
| JP | 2010-211171 A | 9/2010 |

(Continued)

OTHER PUBLICATIONS

English machine translation of JP 2010-21171 (Kentaro).*
International Search Report dated Jan. 6, 2015, issued for PCT/JP2014/075238.

*Primary Examiner* — Matthew Mikels
(74) *Attorney, Agent, or Firm* — Wenderoth, Lind & Ponack, L.L.P.

(57) ABSTRACT

There is provided a light diffuser which can alleviate glare of light emitted from a light source while preventing a decrease in brightness of the emitted light despite the presence of the light diffuser. The light diffuser, contains a thermoplastic resin and transparent particles added thereto. The light diffuser has a total light transmittance in a range of 50 to 85%, and a wavelength selectivity in a rectilinear light ratio in a range of 1.5 to 5.0, as obtained by following formulas (1)-(3):

(wavelength selectivity in rectilinear light ratio)=
  (rectilinear light ratio of 550-nm light)/(rectilinear light ratio of 450-nm light)    (1)

(rectilinear light ratio of 550-nm light)=(rectilinear light transmittance for 550-nm light)/(total transmittance for 550-nm light)    (2)

(rectilinear light ratio of 450-nm light)=(rectilinear light transmittance for 450-nm light)/(total transmittance for 450-nm light)    (3).

13 Claims, 5 Drawing Sheets

(51) Int. Cl.
*F21V 3/06* (2018.01)
*F21K 9/232* (2016.01)
*F21K 9/27* (2016.01)
*F21Y 101/00* (2016.01)
*F21K 9/69* (2016.01)

(52) U.S. Cl.
CPC .............. *G02B 5/0242* (2013.01); *F21K 9/27* (2016.08); *F21K 9/69* (2016.08); *F21Y 2101/00* (2013.01)

(56) References Cited

FOREIGN PATENT DOCUMENTS

| | | |
|---|---|---|
| JP | 2011-102917 | 5/2011 |
| JP | 2011-150790 | 8/2011 |
| JP | 2011-221512 A | 11/2011 |
| JP | 2012-092306 A | 5/2012 |

\* cited by examiner

LIGHT DIFFUSER AND ITS USE

TECHNICAL FIELD

The present invention relates to a light diffuser and its use (as a laminated light diffuser, a light diffusion cover for an LED luminaire, and an LED luminaire) suitable as a light diffuser for an LED light source. In this context, the light diffuser for an LED (light emitting diode) light source includes: a light diffusion cover for an LED luminaire, which surrounds an LED light source and which diffuses light from the LED light source, to be used for an LED luminaire having an LED light source (for example, for an LED light bulb or a light bulb-type LED luminaire, a double-capped LED luminaire, an LED desk light or an LED desk lamp, an LED ceiling light, etc.); a light diffusion sheet for a display, which is overlaid on an LED light source and which diffuses light from the LED light source, to be used for a display using an LED light source (for example, for a liquid crystal display using an LED light source); and the like.

BACKGROUND ART

Recently, LED luminaires which use LED light sources, particularly white LED light sources, are widely employed.

An LED light source is highly directional. In order to alleviate glare, an LED luminaire having an LED light source is provided with a semi-transparent light diffusion cover (a light diffusion cover for an LED luminaire) which surrounds the LED light source and which has a light diffusion function for diffusing light emitted from the LED light source.

Conventionally known light diffusion covers for LED luminaires include a light diffusion cover for an LED luminaire in which transparent inorganic particles (such as calcium carbonate particles and barium sulfate particles) or transparent resin particles (such as crosslinked acrylic-based resin particles and crosslinked acrylic-styrene copolymer particles) are blended in a transparent thermoplastic resin (such as an acrylic-based resin or polycarbonate).

In a spectral irradiance distribution of a typical LED light source used for an LED luminaire, peaks appear at around 450 nm and around 550 nm. Since light having the shorter peak wavelength around 450 nm is glaring to the human eyes, a light diffusion cover for an LED luminaire which effectively diffuses light around 450 nm is practical for alleviation of glare.

A wavelength region between 380 nm to 500 nm is known as a blue light region. Light having the shorter peak wavelength around 450 nm is in this region and is called blue light. Recent studies warn that blue light is harmful to the human eyes. Hence, a light diffusion material for diffusing light in the blue light region, which can reduce rectilinear light in the blue light region, is assumed to be useful for eye protection.

Therefore, it will be effective for alleviation of glare and eye protection if a light diffuser (such as a light diffusion cover having a wavelength-dependent light diffusion property) in which the light diffusion property around 450 nm is prominently greater than the light diffusion property at the other wavelengths becomes available.

Nevertheless, no one has been working on a technology for imparting wavelength selectivity in light diffusivity to a light diffuser (such as a light diffusion cover) such that the light diffusivity around 450 nm is prominently greater than the light diffusivity at the other wavelengths.

In the meantime, there has been proposed an optical sheet for a liquid crystal display such as a PC monitor and a television, having a reduced wavelength dependence in order to mitigate a color change due to a viewing angle (see Patent Literature 1).

CITATION LIST

Patent Literature

[Patent Literature 1] JP 2011-221512 A

SUMMARY OF INVENTION

Technical Problem

However, the above-mentioned conventional art is focused on reducing wavelength dependence in light transmission of an optical sheet, and provides no thoughts on imparting wavelength selectivity in light diffusivity to an optical sheet such that the light diffusivity around 450 nm is prominently greater than the light diffusivity at the other wavelengths.

The present invention is made in view of the above problems, and aims to provide a light diffuser which can alleviate glare of light emitted from a light source while preventing a decrease in brightness of the emitted light despite the presence of the light diffuser. The present invention also aims to provide a laminated light diffuser, a light diffusion cover for an LED luminaire, and an LED luminaire, each using this light diffuser.

Solution to Problem

A light diffuser according to the present invention is characterized in containing a thermoplastic resin and transparent particles added thereto, wherein the light diffuser has a total light transmittance in a range of 50 to 85%, and a wavelength selectivity in a rectilinear light ratio in a range of 1.5 to 5.0, as obtained by following formulas (1)-(3):

$$\text{(wavelength selectivity in rectilinear light ratio)} = \text{(rectilinear light ratio of 550-nm light)} / \text{(rectilinear light ratio of 450-nm light)} \quad (1)$$

$$\text{(rectilinear light ratio of 550-nm light)} = \text{(rectilinear light transmittance for 550-nm light)} / \text{(total transmittance for 550-nm light)} \quad (2)$$

$$\text{(rectilinear light ratio of 450-nm light)} = \text{(rectilinear light transmittance for 450-nm light)} / \text{(total transmittance for 450-nm light)} \quad (3).$$

In this arrangement, the wavelength selectivity in the rectilinear light ratio obtained by the formulas (1)-(3) is 1.5 or higher, and the rectilinear light ratio of 450-nm light is 1/1.5 or less relative to the rectilinear light ratio of 550-nm light. This means the light diffusion property of 450-nm light is high enough relative to the light diffusion property of 550-nm light. The light diffuser satisfying such a requirement can sufficiently diffuse light having wavelengths around 450 nm in the blue light region, which is glaring and harmful to the human eyes, and can allow a reduced amount of light having wavelengths around 450 nm to travel straight from the light source to the human eyes. As a result, the light diffuser can alleviate glare of light emitted from the light source (can reduce stimulation to the human eyes). It is also expected that the light diffuser can prevent a harmful effect on the human eyes due to light emitted from the light source. Generally, light having wavelengths around 450 nm accounts for a significant portion of light emitted from an LED light source. Hence, the effect of alleviating glare of light emitted from a light source is prominent when the light source is an LED light source (namely, when the light diffuser is used for an LED light source). Therefore, the light diffuser of the present invention is particularly suitable as a light diffuser for an LED light source.

Also in this arrangement, the wavelength selectivity in the rectilinear light ratio obtained by the formulas (1)-(3) is 1.5 or higher, and the rectilinear light ratio of 550-nm light is 1.5 times as great as or greater than the rectilinear light ratio of 450-nm light. This means the light diffusion property of 550-nm light is low enough relative to the light diffusion property of 450-nm light. As a result, light transmitted through this light diffuser retains the shape of a light source (including the sun), is less stimulating to the eyes, and looks distinctively warm. Such light is suitable for a clear light bulb (a bare bulb having a transparent glass cover) and a chandelier light bulb. When the light source is an LED light source, light transmitted through this light diffuser retains a dot-like appearance of the LED light source, is less stimulating to the eyes, and looks distinctively warm. Therefore, the light diffuser of the present invention is suitable as a light diffuser for an LED light source, and is particularly suitable as a light diffuser for an LED light source to be used for a clear light bulb equipped with an LED light source or with a chandelier light bulb equipped with an LED light source.

Further in this arrangement, the total light transmittance is 50% or higher, so that light emitted from the light source can sufficiently penetrate through the light diffuser. It is thereby possible to prevent a decrease in brightness of the emitted light (from a device containing an LED or other light source as a constitutive element: for example, a luminaire such as an LED luminaire, a display equipped with an LED light source, and the like) despite the presence of the light diffuser (in the case where the light source and the light diffuser constitute an luminaire, it is possible to prevent a decrease in illuminance of the luminaire). Therefore, by using the light diffuser, it is possible to provide a light source-equipped device (such as a luminaire or a display) which can emit bright light.

A laminated light diffuser of the present invention is characterized in including the light diffuser of the present invention and another light diffuser laminated thereon. The other light diffuser has a total light transmittance in a range of 50 to 90%, and a degree of dispersion of in a range of 5 to 60°, wherein the degree of dispersion is defined as a transmission angle at which a light transmittance is 50% of a rectilinear light transmittance when a surface of the other light diffuser is irradiated from a direction normal to the surface.

In this arrangement, the light diffuser of the present invention excels in diffusion of light in the blue light region, and the other light diffuser diffuses light of all wavelengths. By laminating these light diffusers, it is possible to provide a laminated diffuser through which dots of LEDs (for example, LED chips) are less conspicuous and which scatters light in the blue light region even better.

Preferably, the light diffuser and the laminated light diffuser of the present invention are used for an LED light source. The light diffuser and the laminated light diffuser of the present invention can alleviate stimulation to the eyes which is peculiar to LED light (light emitted from an LED light source).

A light diffusion cover for an LED luminaire of the present invention is characterized in including the light diffuser for an LED light source of the present invention and having a cylindrical or part-cylindrical shape. An LED luminaire of the present invention is characterized in including this light diffusion cover for an LED luminaire.

By constituting an LED luminaire with this cylindrical or part-cylindrical light diffusion cover for an LED luminaire which includes the light diffuser of the present invention, it is possible to provide a fluorescent-type LED luminaire which allows visual recognition of LED dots and which alleviates stimulation to the eyes even if one looks straight at the light. Since the LED luminaire which uses this light diffusion cover for an LED luminaire including the light diffuser of the present invention allows visual recognition of LED dots, one can tell by its appearance that the luminaire has an LED light source.

A light diffusion cover for an LED luminaire of the present invention is characterized in including the light diffuser for an LED light source of the present invention and having a shape of a light bulb. An LED luminaire of the present invention is characterized in including this light diffusion cover for an LED luminaire.

By constituting an LED luminaire with this light bulb-shaped light diffusion cover for an LED luminaire which includes the light diffuser of the present invention, it is possible to provide a clear light-bulb LED luminaire in which LEDs at the light emitting part look like light-emitting filaments of a bare bulb. Besides, light emitted from such an LED luminaire is less stimulating to the eyes and looks warm in an illuminated space. An LED luminaire which uses the light bulb-shaped light diffusion cover for an LED luminaire including the light diffuser of the present invention is suitable in creating an attractive atmosphere by lighting, such as lighting for dining tables, restaurants and bars, shop windows, and the like.

A light diffusion cover for an LED luminaire of the present invention is characterized in including the laminated light diffuser for an LED light source of the present invention and having a cylindrical or part-cylindrical shape. An LED luminaire of the present invention is characterized in including this light diffusion cover for an LED luminaire.

By constituting an LED luminaire with this cylindrical or part-cylindrical light diffusion cover for an LED luminaire which includes the laminated light diffuser of the present invention, it is possible to provide a fluorescent-type LED luminaire in which LED dots are less conspicuous and which alleviates stimulation to the eyes even if one looks straight at the light.

A light diffusion cover for an LED luminaire of the present invention is characterized in including the laminated light diffuser for an LED light source of the present invention and having a shape of a light bulb. An LED luminaire of the present invention is characterized in including this light diffusion cover for an LED luminaire.

By constituting an LED luminaire with this light bulb-shaped light diffusion cover for an LED luminaire which includes the laminated light diffuser of the present invention, it is possible to provide a light bulb-type LED luminaire in which LED dots are less conspicuous and which alleviates stimulation to the eyes even if one looks straight at the light.

According to the definitions for the present invention, the light diffusion cover for an LED luminaire having a shape of a light bulb encompasses a hemispherical light diffusion cover 1A for an LED luminaire, a pear-shaped light diffusion cover 1B for an LED luminaire, a light diffusion cover 1C for an LED luminaire whose shape is analogous to candle flame, and other light diffusion covers for an LED luminaire having similar shapes. As shown in FIG. 3A, the light diffusion cover 1A for an LED luminaire constitutes, together with an LED luminaire main body 2A, an LED luminaire 10A having a shape of a light bulb to be used in combination with a lampshade. As shown in FIG. 3B, the light diffusion cover 1B for an LED luminaire constitutes, together with an LED luminaire main body 2B, an LED luminaire 10B having a shape of a light bulb to be used as a bare bulb. As shown in FIG. 3C, the light diffusion cover 1C for an LED luminaire constitutes, together with an LED luminaire main body 2C, an LED luminaire 10C having a shape of a light bulb to be used as a chandelier light bulb.

According to the definitions for the present invention, the light diffusion cover for an LED luminaire having a cylindrical or part-cylindrical shape encompasses a cylindrical light diffusion cover 1D for an LED luminaire as shown in FIG. 4A, a semicylindrical light diffusion cover 1E for an LED luminaire as shown in FIG. 4B, and the like. Together with LED luminaire main bodies, these cylindrical/semicylindrical light diffusion covers for LED luminaires constitute columnar LED luminaires.

Advantageous Effects of Invention

The present invention can provide a light diffuser which can alleviate glare of light emitted from a light source while preventing a decrease in brightness of the emitted light despite the presence of the light diffuser. The present invention can also provide a laminated light diffuser, a light diffusion cover for an LED luminaire, and an LED luminaire, each using this light diffuser.

BRIEF DESCRIPTION OF DRAWINGS

FIG. 3A shows a hemispherical light diffusion cover for an LED luminaire. FIG. 3B shows a pear-shaped light diffusion cover for an LED luminaire, illustrated with an LED luminaire main body. FIG. 3C shows a light diffusion cover for an LED luminaire whose shape is analogous to candle flame.

FIG. 4A shows a cylindrical light diffusion cover for an LED luminaire. FIG. 4B shows a semicylindrical light diffusion cover for an LED luminaire.

DESCRIPTION OF EMBODIMENTS

Figure 1:
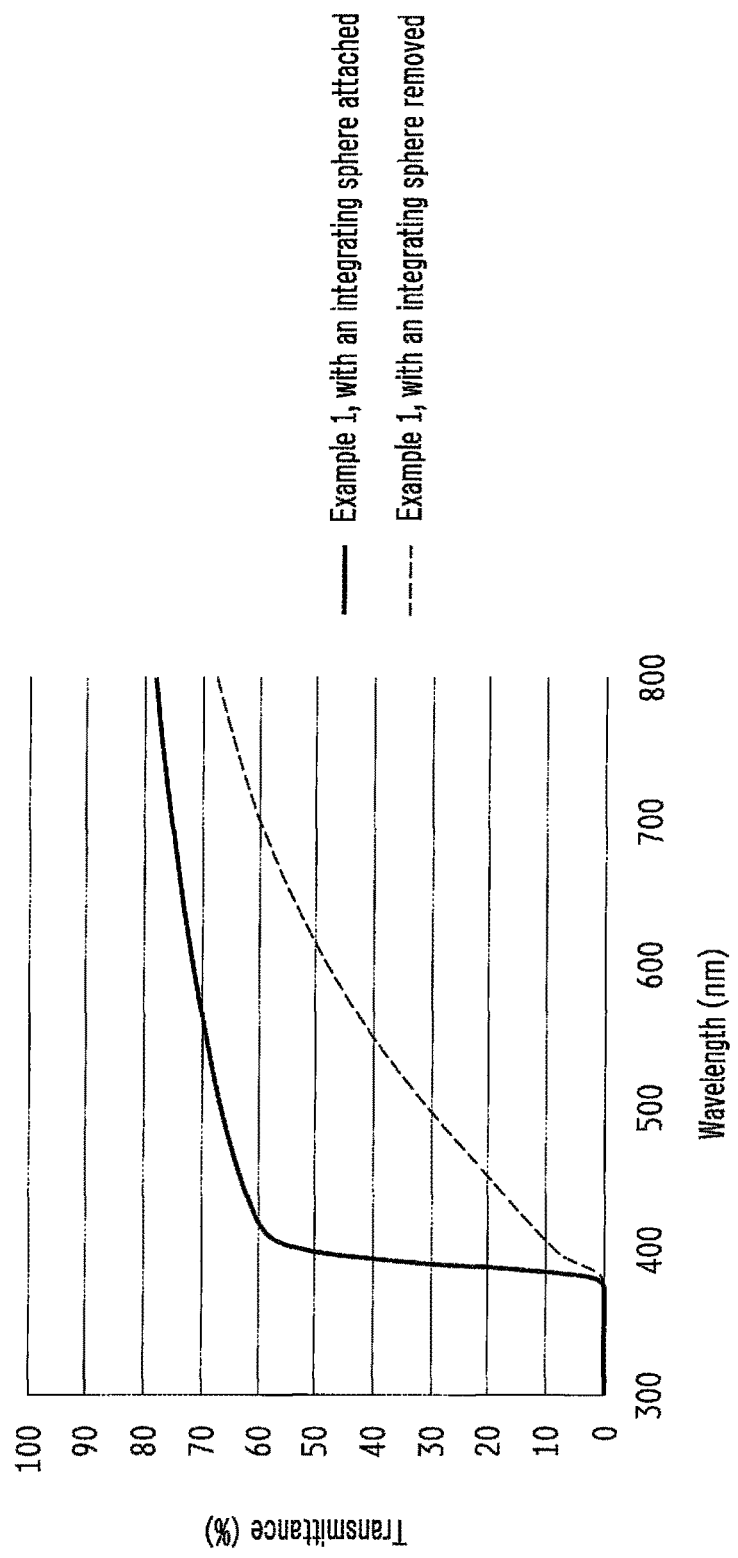
FIG. 1 is a graph which represents spectral transmittance of a light diffusion cover for an LED luminaire obtained in Example 1, measured by an UV-visible spectrophotometer with an integrating sphere attached and with an integrating sphere removed.

The present invention is hereinafter described in detail.

A light diffuser of the present invention contains a thermoplastic resin and transparent particles added thereto, having a total light transmittance in a range of 50 to 85% and a wavelength selectivity in a rectilinear light ratio in a range of 1.5 to 5.0, with a proviso that the wavelength selectivity in the rectilinear light ratio is obtained by following formulas (1)-(3):

(wavelength selectivity in the rectilinear light ratio)= (rectilinear light ratio of 550-nm light)/(rectilinear light ratio of 450-nm light)    (1)

(rectilinear light ratio of 550-nm light)=(rectilinear light transmittance for 550-nm light)/(total transmittance for 550-nm light)    (2)

(rectilinear light ratio of 450-nm light)=(rectilinear light transmittance for 450-nm light)/(total transmittance for 450-nm light)    (3).

The wavelength selectivity in the rectilinear light ratio obtained by the formulas (1)-(3) is more preferably in a range of 1.8 to 5.0, and even more preferably in a range of 2.5 to 5.0. This arrangement can further alleviate glare of light emitted from the light source. As the value of the wavelength selectivity in the rectilinear light ratio obtained by the formulas (1)-(3), it is difficult to bring this value to over 5.0, while keeping the total light transmittance at 50% or higher. The wavelength selectivity in the rectilinear light ratio obtained by the formulas (1)-(3) can be mainly adjusted by changing the volume-average particle size of the transparent particles, the amount of the transparent particles, and the thickness (the plate thickness) of the light diffuser.

Regarding the formula (3), the rectilinear light ratio of 450-nm light is preferably in a range of 0.01 to 0.5, more preferably in a range of 0.02 to 0.5, and even more preferably in a range of 0.07 to 0.5. The light diffusion property of 450-nm light can be enhanced by adjusting the rectilinear light ratio of 450-nm light obtained by the formula (3) to 0.5 or less. The light diffuser having such a rectilinear light ratio can significantly diffuse light having wavelengths around 450 nm in the blue light region, which is glaring and harmful to the human eyes, and can allow a significantly reduced amount of light having wavelengths around 450 to travel straight from the light source to the human eyes. As a result, the light diffuser can remarkably alleviate glare of light emitted from the light source. It is also expected that the light diffuser can further prevent a harmful effect on the human eyes due to light emitted from the light source. On the other hand, if the rectilinear light ratio of 450-nm light obtained by the formula (3) is below the lowest limit of the above ranges, the light diffusion property of 450-nm light is too high and makes it difficult to keep the total light transmittance at 50% or higher.

The rectilinear light ratio of 550-nm light obtained by the formula (2) is preferably in a range of 0.05 to 0.7, more preferably in a range of 0.1 to 0.7, and even more preferably in a range of 0.2 to 0.7. The light diffuser having such a rectilinear light ratio can provide light with reduced glare, while keeping the total light transmittance.

The total light transmittance of the light diffuser may be in a range of 50 to 85%, more preferably in a range of 65 to 85%, and even more preferably in a range of 75 to 85%. The light diffuser having such a total light transmittance allows a greater amount of light emitted from the light source to penetrate through the light diffuser, and can hence prevent a decrease in brightness of the emitted light despite the presence of the light diffuser. Therefore, by using the light diffuser, it is possible to provide a light source-equipped device (such as a luminaire or a display) which can emit bright light. Incidentally, in order to raise the wavelength selectivity in the rectilinear light ratio obtained by the formulas (1)-(3) to 1.5 or higher, it is necessary to add a sufficient amount of transparent particles for this purpose, which inevitably reduces the total light transmittance in comparison with the case where such additional transparent particles are absent. For this reason, it is difficult to raise the total light transmittance to over 85%.

Although the shape and thickness of the light diffuser are not particularly limited as far as the light diffuser can exhibit the optical effects of the present invention, a light diffusion plate (a plate-like light diffuser) having a thickness in a range of 0.5 to 3 mm is preferable. In the case where the light diffuser is a plate-shaped light diffusion cover for an LED luminaire (a type of light diffusion plate) to be used for an LED luminaire such as an LED light bulb or a double-capped LED, the thickness (the plate thickness) of the plate-shaped light diffusion cover for an LED luminaire is more preferably in a range of 1 to 2 mm, in consideration of the demand for lightweight LED light bulbs and double-capped LEDs.

The size and shape of the light diffusion cover for an LED luminaire are not particularly limited and may be designed, for example, to match the size and shape of a light emitting part (a part of an LED luminaire excluding the light diffusion cover) of an LED luminaire such as an LED light bulb, a double-capped LED luminaire, an LED desk light, and an LED ceiling light.

Preferably, the light diffuser of the present invention satisfies the inequality:

$$0.01 < D \times |np - nm| < 0.1$$

wherein D is a volume-average particle size (μm) of the transparent particles, np is a refractive index of the transparent particles, and nm is a refractive index of the thermoplastic resin. If $D \times |np-nm|$ is 0.01 or less, the wavelength selectivity in rectilinear light deteriorates in comparison with the case where $D \times |np-nm|$ is greater than 0.01. On the other hand, if $D \times |np-nm|$ is 0.1 or greater, the total light transmittance tends to deteriorate.

<Transparent Particles>

The transparent particles simply need to be light transmissive. The transparent particles may be particles having a uniform refractive index (for example, particles of a single material, or core-shell particles each containing a core and a shell having the same refractive index), or may be particles containing a plurality of portions having different refractive indexes (for example, core-shell particles each containing a core and a shell having different refractive indexes).

The volume-average particle size of the transparent particles is preferably from 0.2 μm (inclusive) to 1 μm (exclusive), and more preferably from 0.3 μm (inclusive) to 1 μm (exclusive). This requirement contributes to a light diffuser which has a higher total light transmittance and which scatters light in the blue light region even better.

If the transparent particles have a uniform refractive index, the volume-average particle size of the transparent particles is preferably in a range of 0.2 to 0.8 him, more preferably in a range of 0.2 to 0.6 μm, and even more preferably in a range of 0.3 to 0.5 μm. By controlling the volume-average particle size of the transparent particles within such ranges, it is possible to provide a light diffuser which has a higher total light transmittance and which scatters light in the blue light region even better.

If the transparent particles are core-shell particles each containing a core and a shell having different refractive indexes and if the refractive index of the shell is nearly equal to the refractive index of the thermoplastic resin, the volume-average particle size of the core is more preferably in a range of 0.2 to 0.6 μm, and even more preferably in a range of 0.3 to 0.5 μm. By controlling the volume-average particle size of the core within such ranges, it is possible to provide a light diffuser which has a higher total light transmittance and which scatters light in the blue light region even better.

Preferably, the coefficient of variation in particle diameter of the transparent particles is 30% or less. If this coefficient of variation in particle diameter exceeds 30%, the number of transparent particles within a particle diameter range for exhibiting the optical effects of the present invention is so small as to hamper achievement of the optical effects of the present invention.

Materials of the transparent particles (materials constituting the transparent particles) include, for example: synthetic resins such as crosslinked (meth)acrylic-based resins, crosslinked styrene-based resins, polyurethane-based resins, polyester-based resins, silicone-based resins, fluorine-based resins, and copolymers thereof; inorganic substances such as silica, calcium carbonate, and barium sulfate; and the like. Among them, preferable materials are synthetic resins; more preferable materials are crosslinked (meth)acrylic-based resins, crosslinked styrene-based resins, copolymers thereof (crosslinked (meth)acrylic-styrene copolymer), and silicone-based resins; and most preferable materials are crosslinked (meth)acrylic-based resins, crosslinked styrene-based resins, and copolymers thereof. When the thermoplastic resin is polycarbonate, crosslinked (meth)acrylic-based resins are most preferable. The transparent particles may be used alone or in combination. In this specification, the term "(meth)acrylic" means methacrylic or acrylic.

In the case where the transparent particles contain a polymer of a vinyl-based monomer (a compound having at least one ethylenic unsaturated group) containing a crosslinkable monomer (a compound having two or more ethylenic unsaturated groups) such as a crosslinked (meth)acrylic-based resin, a crosslinked styrene-based resin, and a copolymer thereof, this polymer contains a structural unit deriving from the crosslinkable monomer preferably in an amount of 1 to 50% by weight, and more preferably in an amount of 5 to 30% by weight. If such range(s) is/are satisfied, a high-level three-dimensional network can be formed in the transparent particles, and it is eventually possible to provide a light diffuser having a superior light diffusion property.

The crosslinkable monomers include, for example, (meth)acrylate-based polyfunctional monomers such as allyl methacrylate, ethylene glycol di(meth)acrylate, diethylene glycol di(meth)acrylate, triethylene glycol di(meth)acrylate, nonaethylene glycol di(meth)acrylate, tetradecaethylene glycol di(meth)acrylate, decaethylene glycol di(meth)acrylate, pentadecaethylene glycol di(meth)acrylate, 1,3-butylene glycol di(meth)acrylate, 1,4-butanediol di(meth)acrylate, 1,6-hexanediol di(meth)acrylate, glycerin di(meth)acrylate, trimethylolpropane tri(meth)acrylate, pentaerythritol tetra (meth)acrylate, phthalate diethylene glycol di(meth)acrylate, caprolactone-modified dipentaerythritol hexa(meth)acrylate, caprolactone-modified neopentylglycol hydroxypivalate diacrylate, polyester acrylate, and urethane acrylate; and aromatic vinyl-based polyfunctional monomers such as divinyl benzene, divinyl naphthalene, and derivatives thereof. These crosslinkable monomers may be used in combination. In this specification, the term "(meth)acrylate" means methacrylate or acrylate.

The crosslinked (meth)acrylic-based resin contains a monofunctional (meth)acrylic-based monomer. The monofunctional (meth)acrylic-based monomer is not particularly limited as far as being a compound having an acryloyloxy group or a methacryloyloxy group. Examples of the monofunctional (meth)acrylic-based monomer are acrylic acid, methyl acrylate, ethyl acrylate, n-butyl acrylate, isobutyl acrylate, dodecyl acrylate, stearyl acrylate, 2-ethylhexyl acrylate, tetrahydrofurfuryl acrylate, methacrylic acid, methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, and stearyl methacrylate. These monofunctional (meth)acrylic-based monomers may be used alone or in combination.

The styrene-based resin contains a monofunctional styrene-based monomer. The monofunctional styrene-based monomer is not particularly limited as far as being a styrene having an ethylenic unsaturated group. Examples of the styrene-based resin are styrene, o-methylstyrene, m-methylstyrene, p-methylstyrene, and α-methylstyrene. These monofunctional styrene-based monomers may be used alone or in combination. The copolymer of the crosslinked (meth)acrylic-based resin and the crosslinked styrene-based resin contains the above-mentioned monofunctional (meth)acrylic-based monomer and the above-mentioned monofunctional styrene-based monomer.

The refractive index of the transparent particles only needs to be different from the refractive index of the thermoplastic resin. The difference between the refractive index of the transparent particles and that of the thermoplastic resin is preferably in a range of 0.01 to 0.2, and more preferably in a range of 0.02 to 0.1.

The shape of the resin particles is not particularly limited, but a spherical shape is preferable.

The resin particles may be dispersed evenly in the thermoplastic resin in the entire light diffuser, or may be provided as a resin particle layer(s) on a light incident surface side and/or a light output surface side of the thermoplastic resin.

The amount of the transparent particles in the light diffuser is not particularly limited as far as the light diffuser can exhibit the optical effects of the present invention. For a double-capped LED luminaire or an LED light bulb, a preferable amount is in a range of 0.5 to 2.0% by weight. By setting the amount of the transparent particles to 0.5% by weight or more, it is possible to increase the wavelength selectivity in the rectilinear light ratio obtained by the formulas (1)-(3). On the other hand, by setting the amount of the transparent particles to 2.0% by weight or less, it is possible to impart a higher total light transmittance to the light diffuser.

<Thermoplastic Resin>

The thermoplastic resin is not particularly limited as far as it is transparent enough to provide a light diffuser having a total light transmittance of 50% or higher. Examples of the thermoplastic resin are polycarbonate resins; cellulose derivatives such as acetylcellulose, nitrocellulose, cellulose acetate butyrate, ethylcellulose, and methylcellulose; a homopolymer or copolymer of vinyl acetate, a homopolymer or copolymer of vinyl chloride, a homopolymer or copolymer of vinylidene chloride; acetal resins such as polyvinyl formal and polyvinyl butyral; (meth)acrylic-based resins such as acrylic resins (polyacrylic acid esters) and copolymer resins thereof, and methacrylic resins (polymethacrylic acid esters) and copolymer resins thereof; polystyrene resins; polyamide resins; linear polyester resins such as polyethylene terephthalate resins (hereinafter abbreviated as "PET resins"). Among these resins, polycarbonate resins, (meth)acrylic resins, and PET resins are preferable in terms of transparency, thermal resistance, and impact strength. Above all, polycarbonate resins are particularly preferred for their excellent thermal resistance and impact resistance.

The process for forming the light diffuser of the present invention is not particularly limited. The light diffuser may be formed into a sheet by T-die extrusion molding, into a cylindrical or part-cylindrical shape by profile extrusion molding, into a light bulb shape by injection molding or injection blow molding, into a disc shape by sheet forming followed by vacuum molding or pressure molding, or into other like shapes by other like processes.

<Laminated Light Diffuser>

The laminated light diffuser of the present invention has a laminated structure made of a light diffuser of the present invention and another light diffuser. The other light diffuser has a total light transmittance in a range of 50 to 90%, and a degree of dispersion in a range of 5 to 60°. The degree of dispersion is defined as a transmission angle at which the light transmittance is 50% of the rectilinear light transmittance when a surface of the other light diffuser is irradiated from a direction normal to the surface. The laminated light diffuser is obtained, for example, by extrusion molding with use of a multilayer T-die or other molds which can be used in multilayer extrusion.

The other light diffuser in the laminated light diffuser can be made of a resin. The resin constituting the other light diffuser is not particularly limited as far as it is transparent enough to provide a light diffuser having a total light transmittance of 50% or higher. Examples of the thermoplastic resin are polycarbonate resins; cellulose derivatives such as acetylcellulose, nitrocellulose, cellulose acetate butyrate, ethylcellulose, and methylcellulose; a homopolymer or copolymer of vinyl acetate, a homopolymer or copolymer of vinyl chloride, a homopolymer or copolymer of vinylidene chloride; acetal resins such as polyvinyl formal and polyvinyl butyral; (meth)acrylic-based resins such as acrylic resins (polyacrylic acid esters) and copolymer resins thereof, and methacrylic resins (polymethacrylic acid esters) and copolymer resins thereof; polystyrene resins; polyamide resins; linear polyester resins such as PET resins. Among these resins, polycarbonate resins, (meth)acrylic resins, and PET resins are preferable in terms of transparency, thermal resistance, and impact strength. Above all, polycarbonate resins are particularly preferred for their excellent thermal resistance and impact resistance. In the laminated light diffuser, the resin constituting the light diffuser of the present invention and the resin constituting the other light diffuser may be identical to or different from each other.

The thickness of the laminated light diffuser is not particularly limited, but is preferably in a range of 0.5 to 3 mm, and more preferably in a range of 1 to 2 mm in consideration of the demand for lightweight products. The layer thickness of the light diffuser of the present invention constituting the laminated light diffuser is not particularly limited, but is preferably in a range of 0.5 to 3 mm, and more preferably in a range of 0.5 to 2.5 mm in order to exhibit the effects of the present invention while reducing the weight of the laminated light diffuser.

EXAMPLES

Hereinafter, the present invention is described by way of Examples and Comparative Examples, which shall not limit the scope of the present invention. In following Examples and Comparative Examples, various measurements were taken by various methods to be described below, including the method for measuring wavelength selectivity in the rectilinear light ratio of the light diffuser (a light diffusion cover for an LED luminaire in following Examples and Comparative Examples), the method for measuring total light transmittance of the light diffuser, the method for measuring a volume-average particle size of the transparent particles and a coefficient of variation in particle diameter of the transparent particles, the method for measuring a refractive index of the transparent particles, and the method for measuring a degree of dispersion (D50) of the light diffuser.

<Method for Measuring the Wavelength Selectivity in the Rectilinear Light Ratio of the Light Diffuser>

(Measurement of the Rectilinear Light Transmittance)

As a measurement sample, the light diffuser was cut into a piece having a planar size of 50 mm×25 mm. For conditioning, this measurement sample was left still for one hour or longer, in a constant temperature/humidity room at a temperature of 20° C. and a relative humidity of 65%. Later, the measurement sample was subjected to measurement of spectral luminous intensity.

The rectilinear light transmittance was measured from 300 nm to 800 nm in a constant temperature/humidity room conditioned at a temperature of 20° C. and a relative humidity of 65%, with the measurement sample being set in a UV-visible spectrophotometer (model number "UV-2450" manufactured by Shimadzu Corporation) to which an integrating sphere was not attached. As a specific procedure, a film holder (an attachment to the UV-visible spectrophotometer) was set on the UV-visible spectrophotometer at the beginning. Next, the transmittance was measured from 300 nm to 800 nm by the UV-visible spectrophotometer, and the UV-visible spectrophotometer was calibrated such that the intensity of transmitted light at 500 nm was 100%. After the calibration, the measurement sample was set on the film holder, and the transmittance was measured from 300 nm to 800 nm.

For this measurement, following measurement conditions and parameters for the UV-visible spectrophotometer (device parameters) were applied.

(Measurement Conditions)
 Measurement wavelength range: 300 nm to 800 nm
 Scan speed: medium
 Sampling pitch: 1 nm
 Measurement mode: single (Device Parameters)
 Photometric value: transmission
 Slit width: 2.0 mm
 Light source switching wavelength: 360 nm
 S/R exchange: normal (Measurement of the Total Transmittance)

Except that an integrating sphere was attached to the UV-visible spectrophotometer, the total transmittance (the total light transmittance) was measured from 300 nm to 800 nm in the same manner as the measurement of the rectilinear light transmittance.

As a specific procedure, an integrating sphere attachment (model number "ISR-2200" manufactured by Shimadzu Corporation) was set on the UV-visible spectrophotometer (model number "UV-2450" manufactured by Shimadzu Corporation), and white reference standards ($BaSO_4$) were set on the normal side and the reverse side of the integrating sphere attachment. Further, a transmitted light measurement folder (204-03878-03, an accessory to the integrating sphere attachment) was attached to the integrating sphere attachment. Next, the transmittance was measured from 300 nm to 800 nm by the UV-visible spectrophotometer, and the UV-visible spectrophotometer was calibrated such that the intensity of transmitted light at 500 nm was 100%. After the calibration, the measurement sample was set on the transmitted light measurement folder (204-03878-03), and the transmittance was measured from 300 nm to 800 nm.

(Calculation of the Wavelength Selectivity in the Rectilinear Light Ratio Through the Light Diffuser)

The wavelength selectivity in rectilinear light through the light diffuser was calculated by following formulas (1)-(3).

$$\text{(wavelength selectivity in the rectilinear light ratio)} = \text{(rectilinear light ratio of 550-nm light)}/\text{(rectilinear light ratio of 450-nm light)} \quad (1)$$

$$\text{(rectilinear light ratio of 550-nm light)} = \text{(rectilinear light transmittance for 550-nm light)}/\text{(total transmittance for 550-nm light)} \quad (2)$$

$$\text{(rectilinear light ratio of 450-nm light)} = \text{(rectilinear light transmittance for 450-nm light)}/\text{(total transmittance for 450-nm light)} \quad (3)$$

<Method for Measuring the Total Light Transmittance of the Light Diffuser>

The total light transmittance of the light diffuser was measured in accordance with JIS K 7361-1, using a haze meter (product name "NDH4000" manufactured by Nippon Denshoku Industries Co., Ltd.). Two measurement samples were subjected to the measurement, and two measurement values of these samples were averaged and taken as a final measurement value.

<Method for Measuring the Volume-Average Particle Size of the Transparent Particles and the Coefficient of Variation in Particle Diameter of the Transparent Particles, by the Laser Diffraction/Scattering Technique>

In following Examples and Comparative Examples (except Comparative Example 4), the volume-average particle size of the transparent particles and the coefficient of variation in particle diameter of the transparent particles were measured by the laser diffraction/scattering technique as described below.

The volume-average particle size of the transparent particles was measured by a laser diffraction particle size analyzer ("LS 13 320" manufactured by Beckman Coulter, Inc.) and a universal liquid module.

To prepare a dispersion for the measurement, 0.5 grams of slurry containing the transparent particles or 0.1 gram of the transparent particles was dispersed in 10 ml of an aqueous solution of 0.1%-by-weight non-ionic surfactant, by a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR).

For assessment based on Mie theory, following optical parameters were necessary and were set in the software of the laser diffraction particle size analyzer.

<Parameters>
 Real part of the refractive index B.I. of the liquid (aqueous solution of a non-ionic surfactant)=1.333 (refractive index of water)
 Real part of the refractive index of the solid (transparent particles to be measured)=refractive index of the transparent particles
 Imaginary part of the refractive index of the solid=0
 Shape factor of the solid=1

The measurement conditions and the measurement procedure were as given below.

<Measurement Conditions>
 Time of measurement: 60 seconds
 Number of measurement: 1
 Pump rate: 50 to 60%

PIDS relative concentration: about 40 to 55%

Ultrasonic output: 8

<Measurement Procedure>

Offset measurement, optical axis adjustment, and background measurement were carried out in advance. Thereafter, the dispersion was injected, using a dropper, into the universal liquid module of the laser diffraction particle size analyzer. Measurement was started when the concentration in the universal liquid module reached the above PIDS relative concentration and when the software of the laser diffraction particle size analyzer gave an indication "OK". During the measurement, the particles should be kept dispersed in the universal liquid module under pump circulation, and the ultrasonic unit (ULM ULTRASONIC MODULE) should be kept in operation.

The measurement was conducted at room temperature. Using the measurement data and the above-mentioned preset optical parameters, the volume-average particle size (an arithmetic average diameter in the volume-based particle size distribution) of the transparent particles and the coefficient of variation in particle diameter of the transparent particles were calculated by the software of the laser diffraction particle size analyzer.

In the case where the transparent particles were resin particles, the refractive index of a polymer constituting the resin particles was input as the refractive index of the transparent particles, and the measurement was conducted likewise.

<Method for Measuring the Volume-Average Particle Size of the Transparent Particles and the Coefficient of Variation in Particle Diameter of the Transparent Particles, by the Coulter Technique>

In Comparative Example 4 to be described later, the volume-average particle size of the transparent particles and the coefficient of variation in particle diameter of the transparent particles were measured by the Coulter technique as described below.

The volume-average particle size of the transparent particles was measured by Coulter Multisizer III (an analyzer manufactured by Beckman Coulter, Inc.). For measurement, an aperture calibrated according to Multisizer™ 3 User's Manual published by Beckman Coulter, Inc. should be employed.

The aperture for measurement was suitably selected under the following conditions. If the transparent particles to be measured were assumed to have a volume-average particle size of not less than 1 μm and not greater than 10 μm, a 50-μm aperture was selected. If the transparent particles to be measured were assumed to have a volume-average particle size of greater than 10 μm and not greater than 30 μm, a 100-μm aperture was selected. If the transparent particles to be measured were assumed to have a volume-average particle size of greater than 30 μm and not greater than 90 μm, a 280-μm aperture was selected. If the transparent particles to be measured were assumed to have a volume-average particle size of greater than 90 μm and not greater than 150 μm, a 400-μm aperture was selected. In the case where a measured volume-average particle size was different from an assumed one, the aperture was replaced with another aperture having a suitable size, and the volume-average particle size was measured again.

For the 50-μm aperture, Current (aperture current) was set at −800 and Gain was set at 4. For the 100-μm aperture, Current (aperture current) was set at −1600 and Gain was set at 2. For the 280-μm and 400-μm apertures, Current (aperture current) was set at −3200 and Gain was set at 1.

As a measurement specimen, a dispersion was prepared by dispersing 0.1 gram of the transparent particles in 10 ml of an aqueous solution of 0.1%-by-weight non-ionic surfactant, by a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR). A beaker filled with ISOTON® II (an electrolyte solution for measurement, manufactured by Beckman Coulter, Inc.) was placed at a measurement part of Coulter Multisizer III. While gentle stirring was applied in the beaker, the dispersion was added dropwise in such a manner as to adjust the reading of the concentration meter on the main body screen of Coulter Multisizer III to 5 to 10%. After such preparation, measurement was started. During the measurement, stirring was applied in the beaker so gently as not to include air bubbles. The measurement was ended when 100,000 particles were measured. The volume-average particle size of the transparent particles was an arithmetic average of the volume-based particle size distribution of 100,000 particles.

The coefficient of variation (CV) in particle diameter of the transparent particles was calculated by the following formula.

Coefficient of variation in particle diameter of the transparent particles=(standard deviation of the volume-based particle size distribution of the transparent particles/volume-average particle size of the transparent particles)×100

<Method for Measuring the Refractive Index of the Transparent Particles (the Refractive Index at 25° C.)>

For transparent particles (resin particles (E) produced in Resin Particle Production Example 5 to be described later) having a volume-average particle size of over 1 μm, the refractive index was measured by the Becke line test. To start with, transparent particles were placed on a glass slide, and refractive index liquids were dropped thereon (Cargille refractive index liquids, manufactured by Cargille Laboratories, near an expected refractive index were kept available by 0.002 increments in refractive index. For example, refractive index liquids each having a refractive index (refractive index at 25° C., nD25) of 1.538 to 1.562 were kept available by 0.002 increments in refractive index.). After the transparent particles and each refractive index liquid were mixed well, the profile of the transparent particles was observed from above by an optical microscope while the glass slide was irradiated from below by a high-pressure sodium lamp "NX35" (center wavelength 589 nm) manufactured by Iwasaki Electric Co., Ltd. The observation by the optical microscope could be conducted without a particular problem at any magnification as far as the profile of the transparent particles was recognizable. Having said that, a magnification of about 500× would be suitable for observation of particles having a particle diameter of 5 μm.

If the refractive index of a refractive index liquid got closer to the refractive index of the transparent particles, it became harder to see the profile of the transparent particles. Hence, the refractive index of a refractive index liquid at which it was impossible or hardest to see the profile of the transparent particles in that refractive index liquid was deemed to be equal to the refractive index of the transparent particles. If the transparent particles in a refractive index liquid looked similar to those in another refractive index liquid, with a refractive index difference of 0.002 between the two refractive index liquids, an intermediate value between the two refractive index liquids was regarded as the refractive index of the transparent particles. For example, if the transparent particles observed in a refractive index liquid having a refractive index of 1.554 looked similar to those observed in another refractive index liquid having a refractive index of 1.556, the intermediate value of these refractive index liquids, 1.555, was regarded as the refractive index of the transparent particles. For this measurement, the test room temperature was conditioned between 23° C. and 27° C. As for the resin particles having a volume-average particle size of 1 μm or less, the refractive index of the resin particles can be calculated (assumed) by the refractive index of the constituent monomer.

<Method for Measuring the Degree of Dispersion (D50) of the Light Diffuser>

A degree of dispersion (D50) of the light diffuser was defined as a transmission angle at which the light transmittance was 50% of the rectilinear light transmittance when a surface of the light diffuser was irradiated from a direction normal to the surface. The degree of dispersion (D50) was obtained with use of an automatic goniophotometer ("Goniophotometer GP-200" manufactured by Murakami Color Research Laboratory Co., Ltd.) by the following procedure.

From a light source of the automatic goniophotometer, rectilinear light was emitted to the light diffuser which was placed 75 cm away from the light source, from the direction normal to the surface of the light diffuser. The intensity of light transmitted through the light diffuser was measured by a movable photodetector, with a light-receiving angle being changed. The measured intensity was converted into a transmittance, which was plotted on a graph in relation to the light-receiving angle (transmission angle) relative to the direction normal to the surface of the light diffuser. An angle (transmission angle) at which the light transmittance (a rectilinear light transmittance; a light transmittance when the transmission angle was 0°) was 50% of the light transmittance in the direction normal to the surface of the light diffuser was obtained on this graph. This angle (transmission angle) was called degree of dispersion (D50), whose unit was "° (degree)". A greater degree of dispersion (D50) meant a better light diffusion property.

Figure 5:
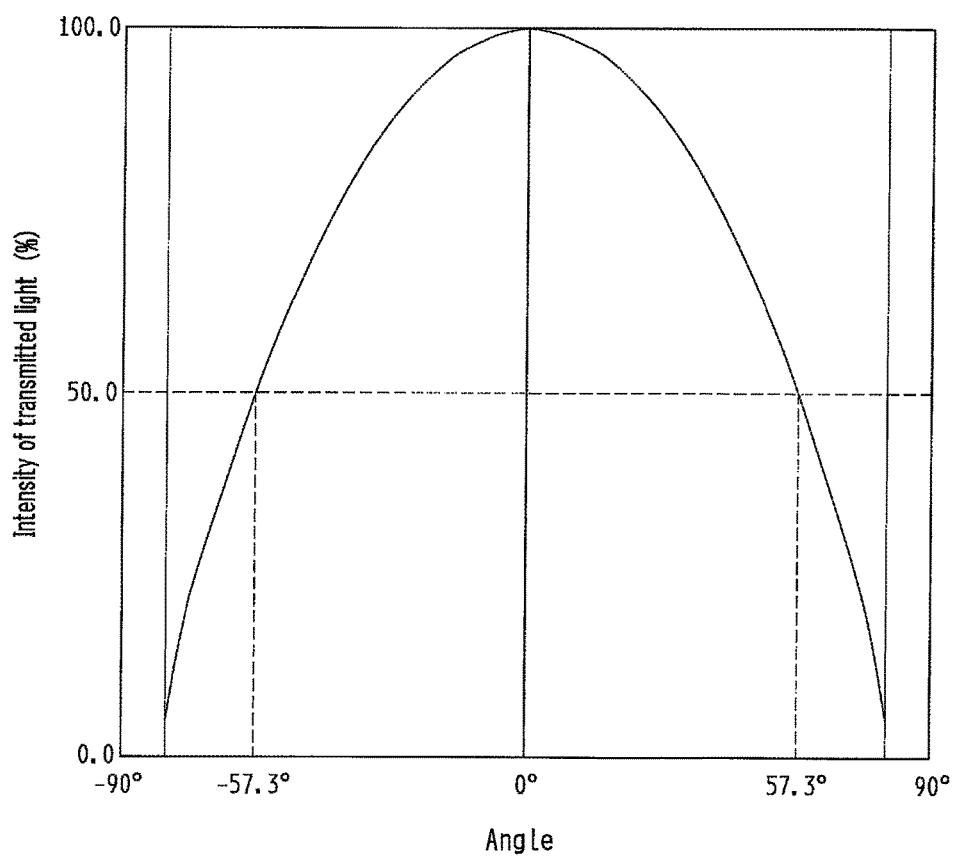
FIG. 5 is a graph which represents an intensity of light transmitted through a light diffusion plate (a light diffuser), measured by an automatic goniophotometer.

FIG. 5 relates to an example where the intensity of light transmitted through the light diffusion plate (the light diffuser) was measured with use of the automatic goniophotometer. In this graph, the vertical axis represents a relative value of the intensity of transmitted light, and perpendicular lines were drawn from points plotted at the intensity of 50% to obtain intersections with the horizontal axis. The horizontal axis represents a degree (°), called degree of dispersion (D50). According to the measurement result shown in FIG. 5, the degree of dispersion (D50) was 57.3°. The degree of dispersion (D50) was an arithmetic average of two absolute values on the left side and the right side of the origin 0° on the horizontal axis (absolute values of two angles at the transmitted light intensity of 50%).

<Resin Particle Production Example 1>

Fed into an autoclave (volume 5 L) equipped with a stirrer and a thermometer were 3200 parts by weight of water as an aqueous medium, 0.8 parts by weight of hydroxyethyl cellulose (product name "HEC Daicel® SP200" manufactured by Daicel FineChem Ltd.) as a polymerization dispersant, and 2.4 parts by weight of sodium p-styrenesulfonate (product name "SPINOMAR® NaSS" manufactured by Tosoh Organic Chemical Co., Ltd.) as a reactive anionic surfactant. The ingredients were mixed and dissolved in the autoclave.

Fed next into the autoclave was a mixed solution (a polymerizable monomer mixture) of 640 parts by weight of methyl methacrylate, prepared in advance, as a monofunctional (meth)acrylic-based monomer, and 160 parts by weight of allyl methacrylate (product name "ACRYESTER® A" manufactured by Mitsubishi Rayon Co., Ltd.) as a crosslinkable monomer. After the autoclave was purged with nitrogen to expel air therein, the contents in the autoclave were heated to 70° C. under stirring at a stirring speed of 200 rpm. Then, 4.0 parts by weight of ammonium persulfate (manufactured by Wako Pure Chemical Industries, Ltd.) as a polymerization initiator was fed into the autoclave, and emulsion polymerization was effected at 70° C. for two hours under stirring.

Thereafter, the internal temperature of the autoclave was kept at 80° C. for an hour to give slurry which contained resin particles. Afterwards, this slurry was cooled down to room temperature (about 25° C.).

Using the obtained slurry (the cooled slurry), the volume-average particle size of the resin particles and the coefficient of variation in particle diameter of the resin particles were measured by the measurement method by the laser diffraction/scattering technique as described above. The result indicated that the volume-average particle size of the resin particles was 0.32 μm, and the coefficient of variation in particle diameter of the resin particles was 15.2%.

The obtained slurry was classified through a wire sieve (aperture width: 400 μm) to remove coarse particles, and then dried by atomization by a spray drier at a feed air temperature (a temperature at a slurry inlet of the spray drier) of 120° C. and a discharge air temperature (a temperature at a powder outlet of the spray drier) of 60° C. Eventually, dry powder of the resin particles was obtained as the transparent particles (hereinafter called "resin particles (A)"). The refractive index of the resin particles (A) (an estimate calculated by the refractive index of the monomer constituting the resin particles) was 1.49.

<Resin Particle Production Example 2>

Except that the amount of sodium p-styrenesulfonate was changed to 0.16 parts by weight, slurry was obtained in the same manner as in Resin Particle Production Example 1.

Using the obtained slurry (the cooled slurry), the volume-average particle size of the resin particles and the coefficient of variation in particle diameter of the resin particles were measured by the measurement method by the laser diffraction/scattering technique as described above. The result indicated that the volume-average particle size of the resin particles was 0.50 μm, and the coefficient of variation in particle diameter of the resin particles was 14.5%.

The slurry was classified and dried by atomization in the same manner as in Resin Particle Production Example 1 to obtain dry powder of the resin particles as the transparent particles (hereinafter called "resin particles (B)"). The refractive index of the resin particles (B) (an estimate calculated by the refractive index of the monomer constituting the resin particles) was 1.49.

<Resin Particle Production Example 3>

Slurry was obtained in the same manner as in Resin Particle Production Example 1, except the following changes. In Resin Particle Production Example 3, hydroxyethyl cellulose was omitted. As the reactive anionic surfactant, 2.4 parts by weight of sodium p-styrenesulfonate was substituted by 24 parts by weight (1 part by weight per 100 parts by weight of the polymerizable monomer mixture) of ammonium salt of polyoxyethylene 1-(allyloxymethyl)alkyl ether sulfate ester (product name "AQUALON® KH-1025" manufactured by Dai-ichi Kogyo Seiyaku Co. Ltd.; purity 25% by weight). The amount of methyl methacrylate was changed to 480 parts by weight. The amount of allyl methacrylate was changed to 120 parts by weight. The amount of ammonium persulfate was changed to 3.0 parts by weight.

Using the obtained slurry (the cooled slurry), the volume-average particle size of the resin particles and the coefficient of variation in particle diameter of the resin particles were measured by the measurement method by the laser diffraction/scattering technique as described above. The result indicated that the volume-average particle size of the resin particles was 0.09 μm, and the coefficient of variation in particle diameter of the resin particles was 26.7%.

The slurry was classified and dried by atomization in the same manner as in Resin Particle Production Example 1 to obtain resin particles as the transparent particles (hereinafter called "resin particles (C)"). The refractive index of the resin particles (C) (an estimate calculated by the refractive index of the monomer constituting the resin particles) was 1.49.

<Resin Particle Production Example 4>
(Production of Seed Particles)

Fed into a reactor (volume 5 L) equipped with a stirrer and a thermometer were 3440 grams of purified water, 860 grams of methyl methacrylate as a monofunctional (meth)acrylic-based monomer, and 17 grams of n-octyl mercaptan (a chain transfer agent). The reactor was purged with nitrogen, and then the internal temperature of the reactor was raised to 70° C. Later, an aqueous solution of potassium persulfate prepared by dissolving 4.3 grams of potassium persulfate (a polymerization initiator) in 70 grams of purified water was fed into the reactor, and the reactor was purged with nitrogen again. Thereafter, methyl methacrylate was allowed to polymerize at 70° C. for 12 hours to give slurry of seed particles having a volume-average particle size of 0.27 μm.

(Production of Resin Particles)

In a solution mixture containing 700 grams of butyl acrylate as a monofunctional (meth)acrylic-based monomer and 300 grams of ethylene glycol dimethacrylate (dimethacrylic acid ethylene glycol) as a crosslinkable monomer, 5 grams of 2,2'-azobis-(2,4-dimethylvaleronitrile) as a polymerization initiator and 10 grams of pentaerythritol tetrakis (thioglycolate) as a thermal stabilizer were dissolved to give a polymerizable monomer component.

Separately from the polymerizable monomer component, 20 grams of phosphate surfactant (product name "PHOSPHANOL LO-529" manufactured by TOHO CHEMICAL INDUSTRY Co., Ltd., a partially neutralized sodium hydroxide of a mixture containing 40% by weight of mono(polyoxyethylene nonylphenol) phosphate and 60% by weight of polyoxyethylene dinonylphenyl ether phosphate) was dissolved in 3000 grams of purified water to give an aqueous surfactant solution. The polymerizable monomer component was mixed into the aqueous surfactant solution, and stirred for 10 minutes at a stirring speed of 8000 rpm, using T.K. homomixer (manufactured by PRIMIX Corporation) to give an emulsion. This emulsion was charged into a reactor (volume 5 L) equipped with a stirrer and a thermometer, and 250 grams of the seed particle-containing slurry was also added. The reactor contents were stirred for four hours at a stirring speed of 120 rpm to cause the seed particles to swell.

Next, the reactor contents (the mixture of the seed particle-containing slurry and the emulsion) were heated to 50° C. to effect three hours of polymerization at this temperature, then heated at 80° C. for three hours, and finally cooled down to 30° C. Using the obtained slurry (the cooled reactor contents), the volume-average particle size of the resin particles and the coefficient of variation in particle diameter of the resin particles were measured by the measurement method by the laser diffraction/scattering technique as described above. The result indicated that the volume-average particle size of the resin particles was 0.82 μm, and the coefficient of variation in particle diameter of the resin particles was 14.3%.

The slurry was classified and dried by atomization in the same manner as in Resin Particle Production Example 1 to obtain resin particles as the transparent particles (hereinafter called "resin particles (D)"). The refractive index of the resin particles (D) (an estimate calculated by the refractive index of the monomer constituting the resin particles) was 1.49.

<Resin Particle Production Example 5>
(Preparation of an Aqueous Phase)

Into a stainless beaker (volume 5 L), 3000 grams of purified water, 1.2 grams (400 ppm) of sodium lauryl sulfate, and 90 grams of magnesium pyrophosphate were charged to give an aqueous phase.

(Preparation of an Oil Phase)

Into another stainless beaker which was separate from the one used for preparation of the aqueous phase, 950 grams of methyl methacrylate as a monomer, 50 grams of ethylene glycol dimethacrylate, and 6 grams of 2,2'-azobis(2,4-dimethylvaleronitrile) as a polymerization initiator were charged and stirred thoroughly to give an oil phase.

(Polymerization)

The thus prepared oil phase was added to the aqueous phase which had been prepared earlier. The oil phase and the aqueous phase were stirred for 15 minutes at a stirring speed of 7000 rpm, using T.K. homomixer (manufactured by PRIMIX Corporation) to give a suspension. This suspension was charged into a reactor (volume 5 L) equipped with a stirrer and a thermometer to effect polymerization of the monomer for five hours at 50° C. After the polymerization, the reactor contents were heated at 105° C. for two hours and then cooled down to 30° C. to give slurry which contained resin particles.

(Post-Treatment after the Polymerization)

Next, hydrochloric acid was added to the slurry which contained resin particles until the pH of the slurry dropped to 2 or less. The resin particle-containing slurry to which hydrochloric acid had been added was rinsed by means of a centrifugal dehydrator until the pH of the rinse water reached 6 to 7. Then, the slurry was dehydrated. The dehydrated cake was dried under vacuum for 20 hours by means of a vacuum drier at a jacket temperature of 60° C. to give a dried product. The dried product was sieved through a 400-mesh sieve to give resin particles (hereinafter called "resin particles (E)").

For the obtained resin particles (E), the volume-average particle size and the coefficient of variation in particle diameter were measured by the Coulter technique. The volume-average particle size of the resin particles (E) was 5.3 μm, and the coefficient of variation in particle diameter of the resin particles (E) was 35.3%. The refractive index of the resin particles (E), measured by the Becke line test as described above, was 1.492.

<Resin Particle Production Example 6>
(Production of Seed Particles)

Fed into a reactor (volume 5 L) equipped with a stirrer and a thermometer were 2600 grams of purified water as an aqueous medium, 12 grams of sodium p-styrenesulfonate as a reactive anionic surfactant, 1200 grams of methyl methacrylate as a monofunctional (meth)acrylic-based monomer, and 24 grams of n-octyl mercaptan (a chain transfer agent). The reactor was purged with nitrogen, and then the internal temperature of the reactor was raised to 80° C. Later, an aqueous solution of potassium persulfate prepared by dissolving 6 grams of potassium persulfate (a polymerization initiator) in 200 grams of purified water was fed into the reactor, and the reactor was purged with nitrogen again. Thereafter, methyl methacrylate was allowed to polymerize at 80° C. for 12 hours, followed by three hours of heating at 100° C. and then by cooling down to room temperature, to give slurry of seed particles having a volume-average particle size of 0.159 μm.

(Production of Resin Particles)

In a solution mixture containing 1140 grams of styrene as a monofunctional monomer and 60 grams of ethylene glycol dimethacrylate as a crosslinkable monomer, 8.1 grams of benzoyl peroxide as a polymerization initiator was dissolved to give a polymerizable monomer component.

Separately from the polymerizable monomer component, 12 grams of phosphate surfactant (product name "PHOSPHANOL LO-529" manufactured by TOHO CHEMICAL INDUSTRY Co., Ltd., a partially neutralized sodium hydroxide of a mixture containing 40% by weight of mono (polyoxyethylene nonylphenol) phosphate and 60% by weight of polyoxyethylene dinonylphenyl ether phosphate), 6 grams of dioctyl sodium sulfosuccinate, and 12 grams of polyoxyethylene styrenated phenyl ether were dissolved in 2400 grams of purified water to give an aqueous surfactant solution. The polymerizable monomer component was mixed into the aqueous surfactant solution and stirred for 10 minutes at a stirring speed of 8000 rpm, using T.K. homomixer (manufactured by PRIMIX Corporation) to give an emulsion. This emulsion was charged into a reactor (volume 5 L) equipped with a stirrer and a thermometer, and 400 grams of the seed particle-containing slurry was also added. The reactor contents were stirred for four hours at a stirring speed of 150 rpm to cause the seed particles to swell.

Next, the reactor contents (the mixture of the seed particle-containing slurry and the emulsion) were heated to 75° C. to effect eight hours of polymerization at this temperature, then heated at 100° C. for three hours, and finally cooled down to 30° C. Using the obtained slurry (the cooled reactor contents), the volume-average particle size of the resin particles and the coefficient of variation in particle diameter of the resin particles were measured by the measurement method by the laser diffraction/scattering technique as described above. The result indicated that the volume-average particle size of the resin particles was 0.39 μm, and the coefficient of variation in particle diameter of the resin particles was 13.5%.

The slurry was classified and dried by atomization in the same manner as in Resin Particle Production Example 1 to obtain resin particles as the transparent particles (hereinafter called "resin particles (F)"). The refractive index of the resin particles (F) (an estimate calculated by the refractive index of the monomer constituting the resin particles) was 1.58.

Example 1

The resin particles (A) as the transparent particles (specifically, aggregates of the resin particles (A)), and polycarbonate (product name "Panlite® L-1250Z 100" manufactured by TEIJIN LIMITED, number average molecular weight 23800, refractive index 1.585, abbreviated as "PC" in Tables 1 and 2) as the thermoplastic resin were weighed in such a ratio that the resin particles (A) was 0.5 parts by weight and polycarbonate was 100 parts by weight. The ingredients were mixed for 15 minutes by a Henschel mixer. Using a single screw extruder (model number "R50" manufactured by Hoshi Plastic), the mixture was extruded at a temperature of 250 to 280° C. at an extrusion rate of 10 to 25 kg/h. The extruded product was cooled with water and cut by a pelletizer to give pellets of a light-diffusing resin composition containing the resin particles (A).

The pellets of the light-diffusing resin composition were injection molded by means of an injection molding machine (model number "FNX140" manufactured by NISSEI PLASTIC INDUSTRIAL CO., LTD.) at a temperature of 300° C. Thus produced was a light diffusion cover for an LED luminaire (a type of light diffuser, a type of light diffusion plate) containing 0.5% by weight of the resin particles (A) and having a flat (plate-like) shape with a thickness of 1 mm and a planar size of 50 mm×50 mm.

Example 2

Except for changing the amount of the resin particles (A) to 1.0 part by weight, a flat light diffusion cover for an LED luminaire containing 1.0% by weight of the resin particles (A) was produced in the same manner as in Example 1.

Example 3

Except for using the resin particles (B) instead of the resin particles (A), a flat light diffusion cover for an LED luminaire was produced in the same manner as in Example 1.

Example 4

Except that the pellets of the light-diffusing resin composition were molded into a 2-mm-thick flat light diffusion cover for an LED luminaire, a flat light diffusion cover for an LED luminaire having a thickness of 2 mm and a planar size of 50 mm×50 mm was produced in the same manner as in Example 1.

Example 5

Except for using the resin particles (D) instead of the resin particles (A), a flat light diffusion cover for an LED luminaire was produced in the same manner as in Example 1.

Comparative Example 1

Except for using the resin particles (C) instead of the resin particles (A), a flat light diffusion cover for an LED luminaire was produced in the same manner as in Example 1.

Comparative Example 2

Except for changing the amount of the resin particles (A) to 0.1 part by weight, a flat light diffusion cover for an LED luminaire containing 0.1% by weight of the resin particles (A) was produced in the same manner as in Example 1.

Comparative Example 3

Except for using the resin particles (D) instead of the resin particles (A), a flat light diffusion cover for an LED luminaire was produced in the same manner as in Example 4.

Comparative Example 4

Except for using the resin particles (E) instead of the resin particles (A), a flat light diffusion cover for an LED luminaire was produced in the same manner as in Example 2.

For the light diffusion covers for LED luminaires obtained in above Examples and Comparative Examples, the thickness of the light diffusion cover, the rectilinear light transmittance for 550-nm light, the total transmittance for 550-nm light, the rectilinear light ratio of 550-nm light, the rectilinear light transmittance for 450-nm light, the total transmittance for 450-nm light, the rectilinear light ratio of 450-nm light, the wavelength selectivity in the rectilinear light ratio, and the total light transmittance are shown in Table 1, along with various parameters for the transparent particles (type, volume-average particle size D, coefficient of variation in particle diameter, amount, and refractive index) and for the thermoplastic resin (type and refractive index) and also with the difference $\Delta n$ between the refractive index of the transparent particles and the refractive index of the thermoplastic resin and the value $D \times \Delta n$. Additionally, regarding the measurement of the wavelength selectivity in the rectilinear light ratio for the light diffusion cover for an LED luminaire obtained in Example 1, FIG. 1 shows, in a solid line, the spectral transmittance at the wavelengths from 300 nm to 800 nm as measured by the UV-visible spectrophotometer with an integrating sphere attached (spectral characteristics of the total transmittance), and FIG. 1 also shows, in a dashed line, the spectral transmittance at the wavelengths from 300 nm to 800 nm as measured by the UV-visible spectrophotometer with an integrating sphere removed (spectral characteristics of the rectilinear light transmittance).

light diffusion covers for LED luminaires obtained in Examples 1-5, values of the wavelength selectivity in the rectilinear light ratio were 1.5 or higher, owing to optimization of the volume-average particle size of the transparent particles, the amount of the transparent particles, and the thickness of the light diffusion covers for LED luminaires. Eventually, the light diffusion covers for LED luminaires obtained in Examples 1-5 were able to diffuse light having wavelengths around 450 nm sufficiently and to alleviate glare of light emitted from the LED light sources. Besides, the light diffusion covers for LED luminaires obtained in Examples 1-5 showed good total light transmittance. Hence, the light diffusion covers for LED luminaires obtained in Examples 1-5 were further able to prevent a decrease in brightness of light emitted by LED luminaires despite the presence of the light diffusers. Additionally, as understood by a comparison between Examples 1-2 and Comparative Example 2, an increase in the amount of the transparent particles led to an increase in the wavelength selectivity in the rectilinear light ratio.

Example 6

Except that the resin particles (A), as the transparent particles, were replaced with silica particles (product name "CERAMATE® TPS-03" manufactured by JGC Catalysts

TABLE 1

| | Examples | | | | | Comparative Examples | | | |
|---|---|---|---|---|---|---|---|---|---|
| | 1 | 2 | 3 | 4 | 5 | 1 | 2 | 3 | 4 |
| Type of transparent particles | resin particles (A) | resin particles (A) | resin particles (B) | resin particles (A) | resin particles (D) | resin particles (C) | resin particles (A) | resin particles (D) | resin particles (E) |
| Volume-average particle size D of transparent particles (μm) | 0.32 | 0.32 | 0.50 | 0.32 | 0.82 | 0.09 | 0.32 | 0.82 | 5.3 |
| Coefficient of variation in particle diameter of transparent particles (%) | 15.2 | 15.2 | 14.5 | 15.2 | 14.3 | 26.7 | 15.2 | 14.3 | 35.3 |
| Amount of transparent particles (% by weight) | 0.5 | 1.0 | 0.5 | 0.5 | 0.5 | 0.5 | 0.1 | 0.5 | 1.0 |
| Type of thermoplastic resin | PC | PC | PC | PC | PC | PC | PC | PC | PC |
| Thickness (mm) | 1 | 1 | 1 | 2 | 1 | 1 | 1 | 2 | 1 |
| Rectilinear light transmittance for 550-nm light (%) | 39.3 | 16.8 | 21.2 | 22.1 | 3.37 | 65.3 | 74.4 | 0.739 | 5.97 |
| Total transmittance for 550-nm light (%) | 69.3 | 57.2 | 72.0 | 69.3 | 66.7 | 82.8 | 84.3 | 49.5 | 86.8 |
| Rectilinear light ratio of 550-nm light | 0.567 | 0.294 | 0.294 | 0.319 | 0.0505 | 0.789 | 0.883 | 0.0149 | 0.0688 |
| Rectilinear light transmittance for 450-nm light (%) | 19.4 | 4.00 | 6.90 | 6.40 | 1.03 | 53.6 | 62.6 | 0.467 | 4.76 |
| Total transmittance for 450-nm light (%) | 62.9 | 50.0 | 66.4 | 62.9 | 61.3 | 76.5 | 82.1 | 44.6 | 85.6 |
| Rectilinear light ratio of 450-nm light | 0.308 | 0.0800 | 0.104 | 0.102 | 0.0167 | 0.701 | 0.762 | 0.0105 | 0.0556 |
| Wavelength selectivity in rectilinear light ratio | 1.84 | 3.67 | 2.83 | 3.13 | 3.02 | 1.13 | 1.16 | 1.43 | 1.24 |
| Total light transmittance (%) | 77.1 | 69.2 | 81.8 | 67.2 | 79.4 | 84.7 | 85.9 | 64.1 | 95.4 |
| Refractive index of transparent particles, np | 1.49 | 1.49 | 1.49 | 1.49 | 1.49 | 1.49 | 1.49 | 1.49 | 1.492 |
| Refractive index of thermoplastic resin, nm | 1.585 | 1.585 | 1.585 | 1.585 | 1.585 | 1.585 | 1.585 | 1.585 | 1.585 |
| Difference of refractive indexes between transparent particles and thermoplastic resin $\Delta n$ (= $|nP - nm|$) | 0.095 | 0.095 | 0.095 | 0.095 | 0.095 | 0.095 | 0.095 | 0.095 | 0.093 |
| $D \times \Delta n$ | 0.030 | 0.030 | 0.048 | 0.030 | 0.078 | 0.009 | 0.030 | 0.078 | 0.493 |

As understood from the above results, in the light diffusion covers for LED luminaires obtained in Comparative Examples 1-5, values of the wavelength selectivity in the rectilinear light ratio were less than 1.5. In contrast, in the and Chemicals Ltd., refractive index 1.458) having a volume-average particle size of about 0.3 μm, a flat light diffusion cover for an LED luminaire was produced in the same manner as in Example 1.

Example 7

Except that the pellets of the light-diffusing resin composition were molded into a 2-mm-thick flat light diffusion cover for an LED luminaire, a flat light diffusion cover for an LED luminaire was produced in the same manner as in Example 6.

Example 8

Except for changing the amount of the silica particles to 1 part by weight, a flat light diffusion cover for an LED luminaire was produced in the same manner as in Example 6.

Example 9

Except that the resin particles (A), as the transparent particles, were replaced with silica particles (product name "COSMO 55" manufactured by JGC Catalysts and Chemicals Ltd., refractive index 1.458) having a volume-average particle size of about 0.5 μm, a flat light diffusion cover for an LED luminaire was produced in the same manner as in Example 1.

Example 10

Except that the pellets of the light-diffusing resin composition were molded into a 2-mm-thick flat light diffusion cover for an LED luminaire, a flat light diffusion cover for an LED luminaire was produced in the same manner as in Example 9.

Example 11

Except that the pellets of the light-diffusing resin composition were molded into a 3-mm-thick flat light diffusion cover for an LED luminaire, a flat light diffusion cover for an LED luminaire was produced in the same manner as in Example 9.

Example 12

Except for changing the amount of the silica particles to 1.0 part by weight, a flat light diffusion cover for an LED luminaire was produced in the same manner as in Example 9.

Example 13

A flat light diffusion cover for an LED luminaire was produced in the same manner as in Example 1, except the following changes. In Example 13, the resin particles (A) (specifically, aggregates of the resin particles (A)), as the transparent particles, were replaced with the resin particles (F) (specifically, aggregates of the resin particles (F)). As the thermoplastic resin, polycarbonate was replaced with an acrylic resin (product name "DELPET® 80HD" manufactured by Asahi Kasei Chemicals Corporation, refractive index 1.49). The extrusion temperature was changed to 230-270° C., and the injection molding temperature was changed to 280° C.

Example 14

Except that the pellets of the light-diffusing resin composition were molded into a 2-mm-thick flat light diffusion cover for an LED luminaire, a flat light diffusion cover for an LED luminaire was produced in the same manner as in Example 13.

Example 15

Except for changing the amount of the resin particles (F) to 1.0 part by weight, a flat light diffusion cover for an LED luminaire was produced in the same manner as in Example 13.

Example 16

A flat light diffusion cover for an LED luminaire was produced in the same manner as in Example 1, except the following changes. In Example 16, as the thermoplastic resin, polycarbonate was replaced with a PET resin (product name "MITSUI PET SA135" manufactured by Mitsui Chemicals, Inc., refractive index 1.58, abbreviated as "C-PET" in Table 3). The extrusion temperature was changed to 240-280° C., and the injection molding temperature was changed to 280° C.

Example 17

Except for changing the amount of the resin particles (A) to 1.0 part by weight, a flat light diffusion cover for an LED luminaire was produced in the same manner as in Example 16.

Comparative Example 5

A flat light diffusion cover for an LED luminaire was produced in the same manner as in Example 1, except the following changes. In Comparative Example 5, the amount of the resin particles (A) was changed to 2.0 parts by weight. As the thermoplastic resin, polycarbonate was replaced with an acrylic resin (product name "DELPET® 80HD" manufactured by Asahi Kasei Chemicals Corporation, refractive index 1.49). The extrusion temperature was changed to 230-270° C., and the injection molding temperature was changed to 280° C. Thus produced was a flat light diffusion cover for an LED luminaire containing 2.0% by weight of the resin particles (A).

For the light diffusion covers for LED luminaires obtained in above Examples and Comparative Examples, the thickness of the light diffusion cover, the rectilinear light transmittance for 550-nm light, the total transmittance for 550-nm light, the rectilinear light ratio of 550-nm light, the rectilinear light transmittance for 450-nm light, the total transmittance for 450-nm light, the rectilinear light ratio of 450-nm light, the wavelength selectivity in the rectilinear light ratio, and the total light transmittance are shown in Tables 2 and 3, along with various parameters for the transparent particles (type, volume-average particle size D, coefficient of variation in particle diameter, amount, and refractive index) and for the thermoplastic resin (type and refractive index) and also with the difference Δn between the refractive index of the transparent particles and the refractive index of the thermoplastic resin and the value D×Δn.

TABLE 2

| | Examples | | | | | | |
|---|---|---|---|---|---|---|---|
| | 6 | 7 | 8 | 9 | 10 | 11 | 12 |
| Type of transparent particles | silica particles CERAMATE ® TPS-03 | silica particles CERAMATE ® TPS-03 | silica particles CERAMATE ® TPS-03 | silica particles COSMO 55 | silica particles COSMO 55 | silica particles COSMO 55 | silica particles COSMO 55 |
| Volume-average particle size D of transparent particles (μm) | 0.34 | 0.34 | 0.34 | 0.56 | 0.56 | 0.56 | 0.56 |
| Coefficient of variation in particle diameter of transparent particles (%) | 16.1 | 16.1 | 16.1 | 13.0 | 13.0 | 13.0 | 13.0 |
| Amount of transparent particles (% by weight) | 0.5 | 0.5 | 1 | 0.5 | 0.5 | 0.5 | 1 |
| Type of thermoplastic resin | PC | PC | PC | PC | PC | PC | PC |
| Thickness (mm) | 1 | 2 | 1 | 1 | 2 | 3 | 1 |
| Rectilinear light transmittance for 550-nm light (%) | 30.7 | 12.8 | 10.9 | 13.1 | 2.8 | 0.9 | 2.4 |
| Total transmittance for 550-nm light (%) | 64.1 | 48.7 | 53.6 | 68.6 | 50.7 | 39.7 | 54.9 |
| Rectilinear light ratio of 550-nm light | 0.479 | 0.263 | 0.203 | 0.191 | 0.055 | 0.022 | 0.044 |
| Rectilinear light transmittance for 450-nm light (%) | 12.80 | 2.73 | 2.14 | 3.70 | 0.64 | 0.34 | 0.63 |
| Total transmittance for 450-nm light (%) | 57.26 | 40.35 | 46.80 | 62.74 | 43.35 | 32.88 | 49.02 |
| Rectilinear light ratio of 450-nm light | 0.224 | 0.068 | 0.046 | 0.059 | 0.015 | 0.010 | 0.013 |
| Wavelength selectivity in rectilinear light ratio | 2.14 | 3.87 | 4.41 | 3.24 | 3.67 | 2.20 | 3.38 |
| Total light transmittance (%) | 74.25 | 61.64 | 67.18 | 80.36 | 65.1 | 53.45 | 70.08 |
| Refractive index of transparent particles, np | 1.458 | 1.458 | 1.458 | 1.458 | 1.458 | 1.458 | 1.458 |
| Refractive index of thermoplastic resin, nm | 1.585 | 1.585 | 1.585 | 1.585 | 1.585 | 1.585 | 1.585 |
| Difference of refractive indexes between transparent particles and thermoplastic resin Δn (= |nP − nm|) | 0.127 | 0.127 | 0.127 | 0.127 | 0.127 | 0.127 | 0.127 |
| D × Δn | 0.043 | 0.043 | 0.043 | 0.071 | 0.071 | 0.071 | 0.071 |

TABLE 3

| | Examples | | | | | Comparative Example |
|---|---|---|---|---|---|---|
| | 13 | 14 | 15 | 16 | 17 | 5 |
| Type of transparent particles | resin particles (F) | resin particles (F) | resin particles (F) | resin particles (A) | resin particles (A) | resin particles (A) |
| Volume-average particle size D of transparent particles (μm) | 0.39 | 0.39 | 0.39 | 0.32 | 0.32 | 0.32 |
| Coefficient of variation in particle diameter of transparent particles (%) | 13.5 | 13.5 | 13.5 | 15.2 | 15.2 | 15.2 |
| Amount of transparent particles (% by weight) | 0.5 | 0.5 | 1 | 0.5 | 1 | 2 |
| Type of thermoplastic resin | acrylic resin | acrylic resin | acrylic resin | C-PET | C-PET | acrylic resin |
| Thickness (mm) | 1 | 2 | 1 | 1 | 1 | 1 |
| Rectilinear light transmittance for 550-nm light (%) | 20.3 | 5.6 | 4.2 | 44.0 | 23.6 | 87.3 |
| Total transmittance for 550-nm light (%) | 74.8 | 61.6 | 65.3 | 75.0 | 66.9 | 90.9 |
| Rectilinear light ratio of 550-nm light | 0.271 | 0.090 | 0.064 | 0.586 | 0.353 | 0.96 |
| Rectilinear light transmittance for 450-nm light (%) | 7.86 | 1.25 | 0.96 | 24.72 | 8.47 | 84.4 |
| Total transmittance for 450-nm light (%) | 71.90 | 57.26 | 62.05 | 68.75 | 59.16 | 88.8 |
| Rectilinear light ratio of 450-nm light | 0.109 | 0.022 | 0.015 | 0.360 | 0.143 | 0.95 |
| Wavelength selectivity in rectilinear light ratio | 2.49 | 4.09 | 4.27 | 1.63 | 2.47 | 1.01 |
| Total light transmittance (%) | 81.19 | 69.14 | 73.36 | 81.04 | 75.89 | 89.56 |
| Refractive index of transparent particles, np | 1.58 | 1.58 | 1.58 | 1.49 | 1.49 | 1.49 |

TABLE 3-continued

|  | Examples | | | | | Comparative Example |
|---|---|---|---|---|---|---|
|  | 13 | 14 | 15 | 16 | 17 | 5 |
| Refractive index of thermoplastic resin, nm | 1.49 | 1.49 | 1.49 | 1.58 | 1.58 | 1.49 |
| Difference of refractive indexes between transparent particles and thermoplastic resin Δn (= \|nP − nm\|) | 0.09 | 0.09 | 0.09 | 0.09 | 0.09 | 0 |
| D × Δn | 0.035 | 0.035 | 0.035 | 0.029 | 0.029 | 0 |

As understood from the above results, in the light diffusion covers for LED luminaires obtained in Comparative Examples 1-5, values of the wavelength selectivity in the rectilinear light ratio were less than 1.5. In contrast, in the light diffusion covers for LED luminaires obtained in Examples 6-17, values of the wavelength selectivity in the rectilinear light ratio were 1.5 or higher, owing to optimization of the volume-average particle size of the transparent particles, the amount of the transparent particles, and the thickness of the light diffusion covers for LED luminaires. Eventually, the light diffusion covers for LED luminaires obtained in Examples 6-17 were able to diffuse light having wavelengths around 450 nm sufficiently and to alleviate glare of light emitted from the LED light sources. Besides, the light diffusion covers for LED luminaires obtained in Examples 6-17 showed good total light transmittance. Hence, the light diffusion covers for LED luminaires obtained in Examples 1-5 were further able to prevent a decrease in brightness of light emitted by LED luminaires despite the presence of the light diffusers.

Example 18

Production Example of a Laminated Light Diffusion Plate

To a multilayer T-die (manufactured by Research Laboratory of Plastics Technology Co., Ltd.), two extruders (model numbers "GT-40-32" and "GT-40-24" manufactured by Research Laboratory of Plastics Technology Co., Ltd.) were mounted. Charged into the "GT-40-32" extruder was a mixture of 0.5 parts by weight of the resin particles (A) and 100 parts by weight of polycarbonate as used in the extrusion operation in Example 2. Charged into the "GT-40-24" extruder was a mixture of polycarbonate and the resin particles (E) which accounted for 4% by weight (relative to the total amount of the polycarbonate and the resin particles (E)). The T-die temperature was set at 290° C. and the extrusion cylinder temperature was set at 260-290° C. Using these two extruders, the materials were extruded at a layer ratio of 1/1 in a total thickness of 1 mm, thereby producing a 1-mm-thick extruded sheet having two different kinds of layers (a laminated light diffusion plate in which two kinds of 0.5-mm-thick light diffusion plates were laminated).

Separately, a mixture of polycarbonate and the resin particles (E) which accounted for 4% by weight (relative to the total amount of the polycarbonate and the resin particles (E)) was hot-press molded into a 0.5-mm-thick light diffusion plate which was similar to the layer containing the resin particles (E) in the above two-layered extruded sheet. This light diffusion plate showed a total light transmittance of 81.9% and a degree of dispersion (D50) of 27.8°.

To manufacture an LED luminaire, a cover of a commercial 40 W double-capped LED luminaire (model number "OLL40SD" manufactured by OBU Inc.) was removed. The light diffusion cover for an LED luminaire, i.e the above extruded sheet, was attached to a main body of the commercial LED luminaire at a position 17 mm away from surfaces of LED chips, thereby giving an LED luminaire in this Example. By visual inspection of light emitted from this LED luminaire, it was found that dots of the LED chips were less conspicuous and that the emitted light was less stimulating to the eyes.

Example 19

Production Example of an LED Luminaire

Except that the materials were extrusion molded in the same shape (a semicylindrical shape) as a cover of a commercial 40 W double-capped LED luminaire (model number "OLL40SD" manufactured by OBU Inc.), a semicylindrical light diffusion cover for an LED luminaire in this Example was produced in the same manner as in Example 2. Thereafter, the cover was removed from the commercial LED luminaire, and the light diffusion cover for an LED luminaire produced in this Example was attached to a main body of the commercial LED luminaire to obtain an LED luminaire in this Example.

By visual inspection of light emitted from the LED luminaire in this Example, it was found that dots of the LED chips were recognizable but that the emitted light was less stimulating to the eyes.

Regarding the LED luminaire produced in this Example and the commercial 40 W double-capped LED luminaire (model number "OLL40SD" manufactured by OBU Inc.), downward illuminance and spectral irradiance after light emission were measured.

The downward illuminance of the LED luminaire in this Example was 244 lux, and that of the commercial LED luminaire was 243 lux. There was hardly any difference in downward illuminance between them.

Figure 2:
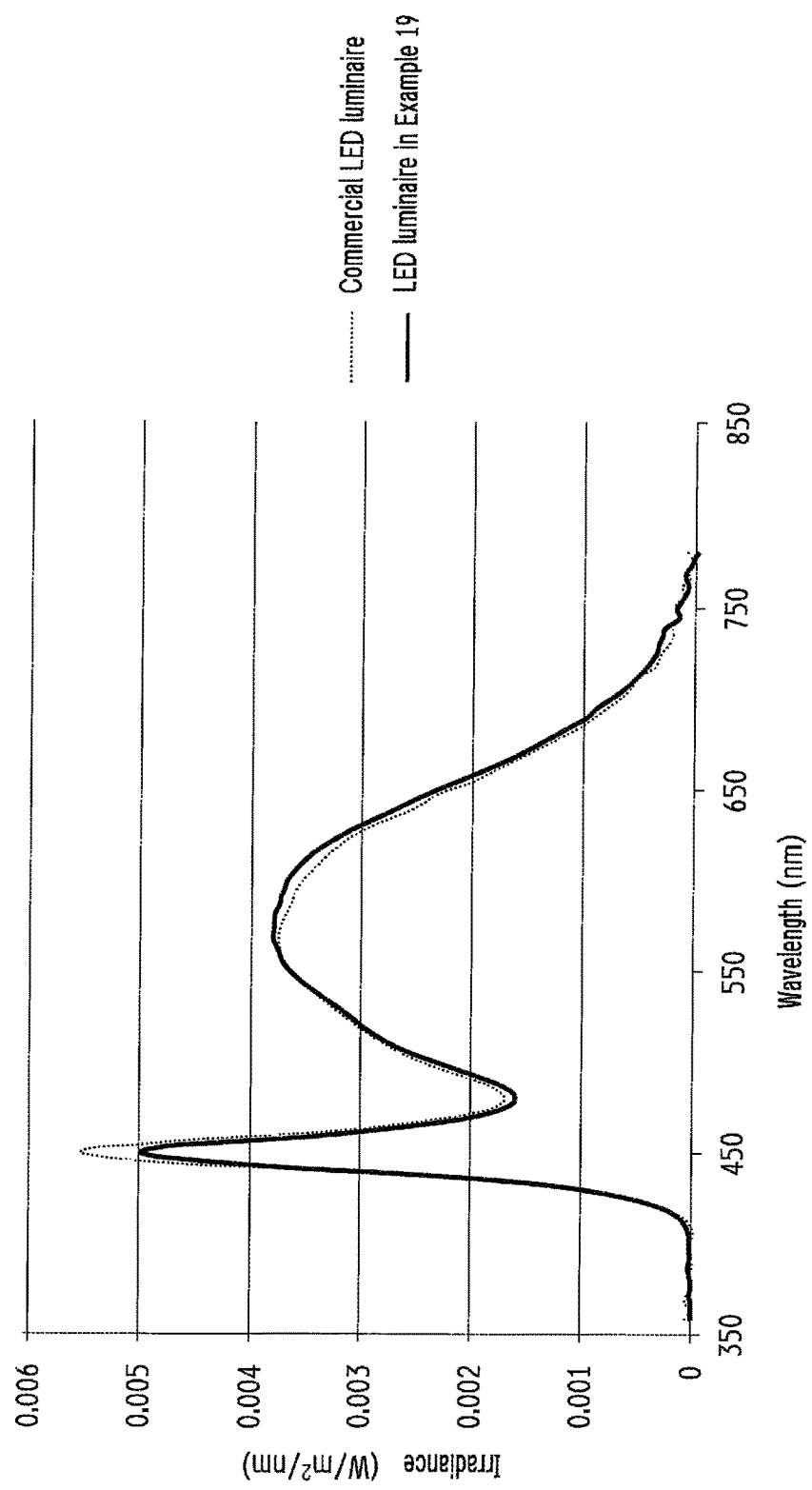
FIG. 2 is a graph which represents spectral irradiance of an LED luminaire obtained in Example 19 and that of a commercial LED luminaire.
Figure 3A:
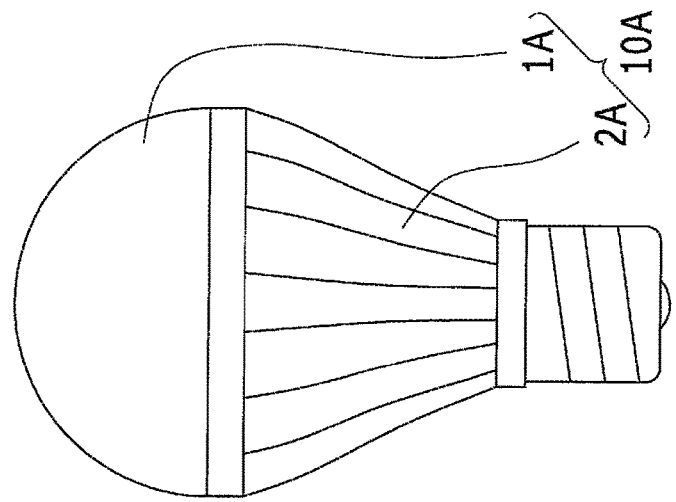
FIGS. 3A-3C are front views of exemplary light diffusion covers for an LED luminaire having a shape of a light bulb according to the present invention.
Figure 3B:
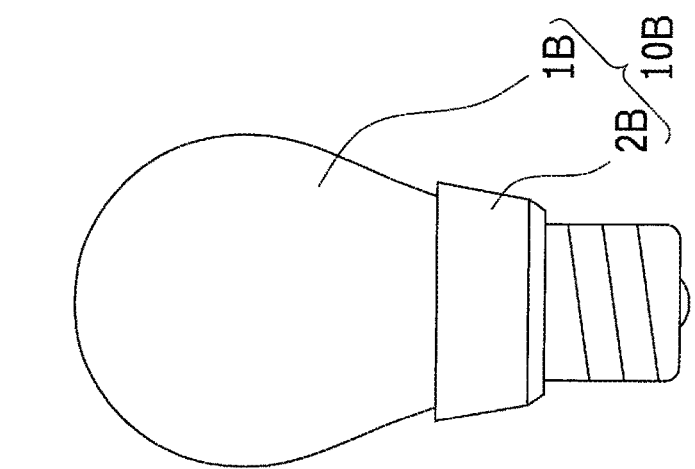
Figure 3C:
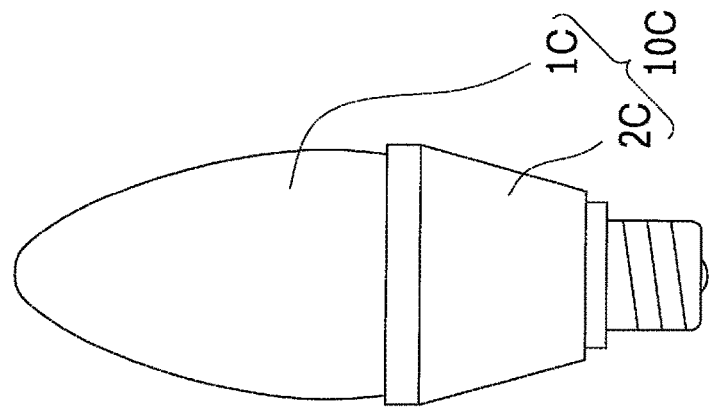
Figure 4A:
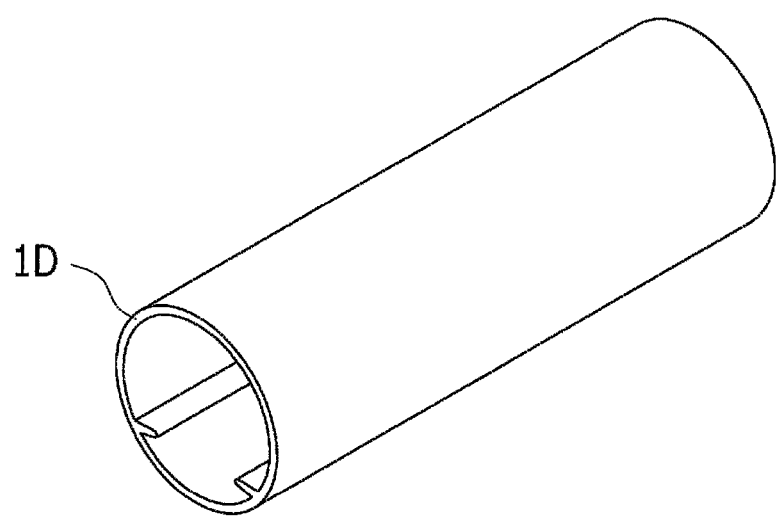
FIGS. 4A and 4B are perspective views of exemplary cylindrical or part-cylindrical light diffusion covers for an LED luminaire according to the present invention.
Figure 4B:
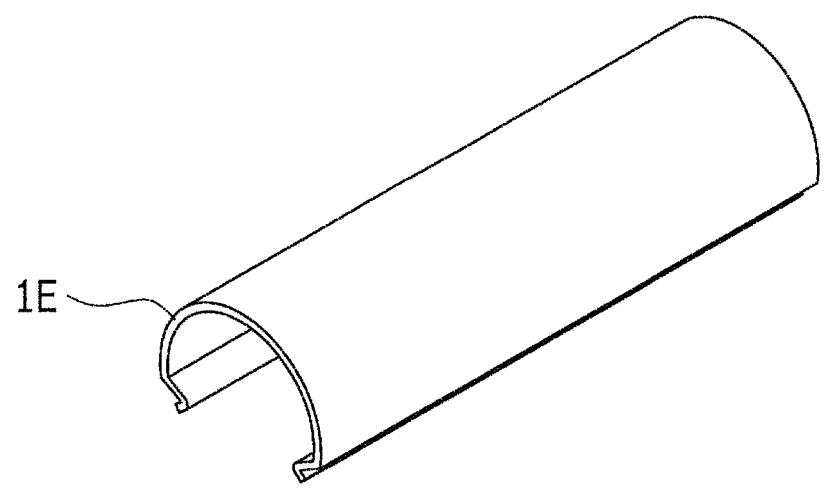

In FIG. 2, the spectral irradiance of the LED luminaire in this Example is shown in solid line, and that of the commercial LED luminaire is shown in dotted line. The spectral irradiance of the LED luminaire in this Example was smaller than that of the commercial LED luminaire around 450 nm, and was similar to that of the commercial LED luminaire around 550 nm. It was thus confirmed that the light diffusion cover for an LED luminaire in the present invention effectively diffused light in the blue light region.

Example 20

Production Example of an LED Luminaire

Except that the materials were injection blow molded in the same shape (in a 1.5-mm-thick pear shape having a diameter of 50 mm) as a cover of a commercial clear bulb-type LED light bulb (product name "EVERLEDS® LDA4L/C" manufactured by Panasonic Corporation), a pear-shaped light diffusion cover for an LED luminaire in this Example was produced in the same manner as in Example 4. Thereafter, the cover was removed from the commercial LED light bulb, and the light diffusion cover for an LED luminaire produced in this Example was attached to a main body of the commercial LED light bulb to obtain an LED luminaire (an LED light bulb) in this Example.

By visual inspection of light emitted from the LED luminaire in this Example, it was found that the shape of LED chips looked like filaments of a bare bulb and that the light emitted from the LED luminaire in this Example looked warmer and less glaring.

REFERENCE SIGNS LIST 1A, 1B, 1C, 1D, 1E light diffusion covers for LED luminaires
10A, 10B, 10C LED luminaires

The invention claimed is:

1. A light diffuser which comprises a thermoplastic resin and transparent particles added thereto,
the light diffuser having:
a total light transmittance in a range of 50 to 85%; and
a wavelength selectivity in a rectilinear light ratio in a range of 1.5 to 5.0, as obtained by following formulas (1)-(3):

(wavelength selectivity in rectilinear light ratio)=
(rectilinear light ratio of 550-nm light)/(rectilinear light ratio of 450-nm light)     (1)

(rectilinear light ratio of 550-nm light)=(rectilinear light transmittance for 550-nm light)/(total transmittance for 550-nm light)     (2)

(rectilinear light ratio of 450-nm light)=(rectilinear light transmittance for 450-nm light)/(total transmittance for 450-nm light)     (3), and the thermoplastic resin being a polycarbonate resin or an acrylic resin.

2. The light diffuser according to claim 1, which is a light diffusion plate having a thickness in a range of 0.5 to 3 mm.

3. The light diffuser according to claim 1, wherein an amount of the transparent particles is in a range of 0.5 to 2.0% by weight.

4. The light diffuser according to claim 1, wherein the rectilinear light ratio of 450-nm light obtained by the formula (3) is in a range of 0.01 to 0.5.

5. The light diffuser according to claim 1, wherein the light diffuser satisfies an inequality:

$0.01 < D \times |np - nm| < 0.1$ wherein D is a volume-average particle size (μm) of the transparent particles, np is a refractive index of the transparent particles, and nm is a refractive index of the thermoplastic resin.

6. The light diffuser according to claim 1, which is used for an LED light source.

7. A laminated light diffuser which comprises the light diffuser according to claim 1 and another light diffuser laminated thereon,
the other light diffuser having:
a total light transmittance in a range of 50 to 90%; and
a degree of dispersion in a range of 5 to 60°, wherein the degree of dispersion is defined as a transmission angle at which a light transmittance is 50% of a rectilinear light transmittance when a surface of the other light diffuser is irradiated from a direction normal to the surface.

8. The laminated light diffuser according to claim 7, which is used for an LED light source.

9. A light diffusion cover for an LED luminaire which comprises the light diffuser according to claim 6 and which has a cylindrical or part-cylindrical shape.

10. A light diffusion cover for an LED luminaire which comprises the light diffuser according to claim 6 and which has a shape of a light bulb.

11. A light diffusion cover for an LED luminaire which comprises the laminated light diffuser according to claim 8 and which has a cylindrical or part-cylindrical shape.

12. A light diffusion cover for an LED luminaire which comprises the laminated light diffuser according to claim 8 which has a shape of a light bulb.

13. An LED luminaire which comprises the light diffusion cover for an LED luminaire according to claim 9.

* * * * *